(12) United States Patent
Su et al.

(10) Patent No.: US 8,181,058 B2
(45) Date of Patent: May 15, 2012

(54) CLOCK-DATA-RECOVERY TECHNIQUE FOR HIGH-SPEED LINKS

(75) Inventors: Jianghui Su, San Jose, CA (US);
 Deqiang Song, San Diego, CA (US);
 Dawei Huang, San Diego, CA (US);
 Muthukumar Vairavan, San Jose, CA (US)

(73) Assignee: Oracle America, Inc., Redwood Shores, CA (US)

(*) Notice: Subject to any disclaimer, the term of this patent is extended or adjusted under 35 U.S.C. 154(b) by 318 days.

(21) Appl. No.: 12/683,147

(22) Filed: Jan. 6, 2010

(65) Prior Publication Data

US 2011/0167297 A1 Jul. 7, 2011

(51) Int. Cl.
| | |
|---|---|
| G06F 1/04 | (2006.01) |
| G06F 13/42 | (2006.01) |
| G06F 12/00 | (2006.01) |
| G06F 11/00 | (2006.01) |
| H03L 7/00 | (2006.01) |
| H03K 5/01 | (2006.01) |
| H03K 3/017 | (2006.01) |
| H03K 7/04 | (2006.01) |
| H03K 9/00 | (2006.01) |
| H04L 12/28 | (2006.01) |
| H04J 3/06 | (2006.01) |
| H03H 7/30 | (2006.01) |
| H04B 15/00 | (2006.01) |
| G01R 13/00 | (2006.01) |
| G01R 25/00 | (2006.01) |
| G06K 5/04 | (2006.01) |
| H03M 13/00 | (2006.01) |

(52) U.S. Cl. ........ 713/503; 713/375; 713/600; 327/141; 327/165; 327/172; 327/291; 370/395.62; 370/518; 375/229; 375/239; 375/316; 455/501; 702/69; 702/79; 710/106; 711/167; 714/700; 714/704; 714/758; 714/798

(58) Field of Classification Search .................. 713/375, 713/503, 600; 327/141, 165, 172, 291; 370/395.62, 370/518; 375/229, 239, 316; 455/501; 702/69, 702/79; 710/106; 711/147; 714/700, 704, 714/758, 798

See application file for complete search history.

(56) References Cited

U.S. PATENT DOCUMENTS

| | | | | |
|---|---|---|---|---|
| 6,370,190 | B1 * | 4/2002 | Young et al. | 375/233 |
| 7,330,508 | B2 * | 2/2008 | Momtaz | 375/233 |
| 7,440,497 | B2 * | 10/2008 | Balan et al. | 375/229 |
| 2010/0284686 | A1 * | 11/2010 | Zhong | 398/1 |
| 2010/0289544 | A1 * | 11/2010 | Lee et al. | 327/159 |

* cited by examiner

Primary Examiner — Stefan Stoynov
(74) Attorney, Agent, or Firm — Park, Vaughn, Fleming & Dowler LLP; Steven E. Stupp (57) ABSTRACT

A receiver circuit is described. In the receiver circuit, an analog-to-digital converter (ADC) generates first samples of a data signal based on a first clock signal, and a clock-data-recovery (CDR) error-detection circuit generates second samples of the data signal based on a second clock signal. In addition, the CDR error-detection circuit estimates intersymbol interference (ISI) at a current sample in the second samples from an adjacent, subsequent sample in the second samples. Based on the second samples and the estimated ISI, a CDR circuit generates the first clock signal and the second clock signal, which involves modifying the skews of either or both of these clock signals so that the current sample is associated with a zero crossing of a pulse response of a communication channel from which the data signal was received, thereby reducing or eliminating the ISI from the adjacent, subsequent sample.

20 Claims, 5 Drawing Sheets

FIG. 5

CLOCK-DATA-RECOVERY TECHNIQUE FOR HIGH-SPEED LINKS

BACKGROUND

1. Field

The present disclosure generally relates to receiver circuits. More specifically, the present disclosure relates to a receiver circuit that performs clock-data-recovery error detection, which is suitable for use in high-speed links.

2. Related Art

To reduce overhead in many communication systems, clock signals are often encoded in the data signals that are transmitted across a communication channels by a transmitter circuit. These clock signals are subsequently recovered from the data signals in a receiver circuit using a clock-data-recovery (CDR) circuit. In the CDR circuit, the phase or skew of the recovered sampling clock is typically adjusted so that the data signals are sampled in the middle of a unit- or bit-time interval. This data-sampling position often provides improved performance and robustness against noise and jitter in the data signals.

However, in high-speed serial links it can be difficult to adjust the skew of the sampling clock so that the data signals are sampled in the middle of the bit-time interval. At lower data rates, the data signals can be oversampled. Because oversampling produces multiple data samples, it is easier to adjust the skew of the sampling clock so that the data signals are sampled at the center and the edge of the bit-time interval. However, as the data rate is increased, oversampling is typically impractical because of increased power consumption. Consequently, at high data rates (such as 10 Gbps), baud-rate sampling is often used (i.e., one data sample per bit-time interval), which can make it more difficult to adjust the skew of the sampling clock.

Furthermore, at high data rates there are often channel-dependent effects, such as intersymbol interference (ISI), which degrade the performance when the data signals are sampled in the middle of the bit-time interval. For example, the optimal data-sampling position may be earlier or later than the middle of the bit-time interval. However, it can be difficult to determine the optimal skew of the sampling clock in the presence of such channel-dependent effects, especially as a function of voltage and temperature.

In order to improve performance, some systems include feed-forward equalizers that modify the data signals to change the data-sampling position. However, if a feed-forward equalizer is implemented in a receiver circuit, there is often an adverse impact on: the signal-to-noise ratio (and, thus, the system performance), the power consumption, and the receive-circuit area (and, thus, on the cost). Alternatively, if a feed-forward equalizer is implemented in a transmitter circuit, it can adversely impact the signal-to-noise ratio (and, thus, the system performance).

Hence, what is needed is a receiver circuit and an associated system that does not suffer from the above-described problems.

SUMMARY

One embodiment of the present disclosure provides a receiver circuit that includes a first input node that receives a data signal, and an analog-to-digital converter (ADC) that is electrically coupled to the first input node, and which generates first samples of the data signal based on a first clock signal. Furthermore, the receiver circuit includes a clock-data-recovery (CDR) error-detection circuit that is electrically coupled to the first input node, which generates second samples of the data signal based on a second clock signal, and which estimates intersymbol interference (ISI) at a current sample in the second samples from an adjacent, subsequent sample in the second samples. Additionally, the receiver circuit includes a CDR circuit that is electrically coupled to the CDR error-detection circuit, which generates the first clock signal, the second clock signal and a third clock signal based on the second samples and the estimated ISI, where the first clock signal and the second clock signal are generated from the third clock signal.

In some embodiments, the CDR circuit modifies a skew of the third clock signal to generate the first clock signal, and modifies the skew of the third clock signal to generate the second clock signal. Note that the skew of the first clock signal may be different than a skew of the second clock signal.

For example, the CDR circuit may include a skew-modification circuit to modify the skew of the third clock signal to generate the first clock signal, and to modify the skew of the third clock signal to generate the second clock signal. In particular, a skew of a given clock signal, which can include the first clock signal or the second clock signal, may be selected from a set of predefined skews by the CDR circuit. Alternatively, the skew of the given clock signal may be adjusted by the CDR circuit.

In some embodiments, the receiver circuit includes at least two registers to store information specifying the skews of the first clock signal and the second clock signal. Note that at least the two registers may be programmable.

Alternatively or additionally, the receiver circuit may include control logic to provide a signal to the CDR circuit that specifies the skew of the given clock signal. For example, the control logic may provide the signal based at least on a performance metric of the receiver circuit, such as: a mean-square error between a predefined pulse response and given samples, which can include the first samples or the second samples; and/or an error rate associated with the first samples.

Note that the first clock signal and the second clock signal may have a common fundamental frequency and different skews.

In some embodiments, the receiver circuit is coupled to a communication channel that communicates the data signal to the receiver circuit, and the ISI is estimated using a pulse response of the communication channel. For example, the third clock signal may be generated so that the current sample is associated with a zero crossing of the pulse response, thereby reducing or eliminating the ISI from the adjacent, subsequent sample.

Furthermore, the CDR circuit may include an accumulator circuit that determines an accuracy of the estimated ISI during a time interval.

Another embodiment provides a system that includes: a transmitter circuit that provides the data signal; the communication channel electrically coupled to the transmitter circuit; and the receiver circuit electrically coupled to the communication channel.

Another embodiment provides a method for generating the first clock signal and the second clock signal using the receiver circuit. During operation, the input node of the receiver circuit receives the data signal. Then, the ADC in the receiver circuit samples the data signal to generate the first samples based on the first clock signal. Furthermore, the CDR error-detection circuit in the receiver circuit samples the data signal to generate the second samples based on the second clock signal and to estimate ISI at the current sample in the second samples from the adjacent, subsequent sample in the second samples. Next, the CDR circuit in the receiver circuit generates the first clock signal, the second clock signal and the third clock signal based on the second samples and the estimated ISI, where the first clock signal corresponds to the third clock signal, and the second clock signal corresponds to the third clock signal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a receiver circuit, a system that includes the receiver circuit, and a method for generating clock signals using the receiver circuit are described. In the receiver circuit, an analog-to-digital converter (ADC) generates first samples of a data signal based on a first clock signal, and a clock-data-recovery (CDR) error-detection circuit generates second samples of the data signal based on a second clock signal. In addition, the CDR error-detection circuit estimates intersymbol interference (ISI) at a current sample in the second samples from an adjacent, subsequent sample in the second samples. Based on the second samples and the estimated LSI, a CDR circuit generates the first clock signal and the second clock signal, which involves modifying the skews of either or both of these clock signals so that the current sample is associated with a zero crossing of a pulse response of a communication channel from which the data signal was received, thereby reducing or eliminating the ISI from the adjacent, subsequent sample.

This receiver circuit may have improved performance, such as a reduced mean-square error or error rate. In particular, by reducing or eliminating the ISI by modifying either or both of the skews of the clock signals, the receiver circuit solves the problems of incorrect data-sampling position at high data rates, thereby providing improved performance without increasing: the power consumption, the system cost and/or the system complexity. Therefore, the receiver circuit may provide high-signal-level samples of the data signal that are robust against jitter and noise in the data signal. In addition, the receiver circuit may be adapted or adjusted, at least in part, to compensate for channel-dependent effects such as ISI.

Figure 1:
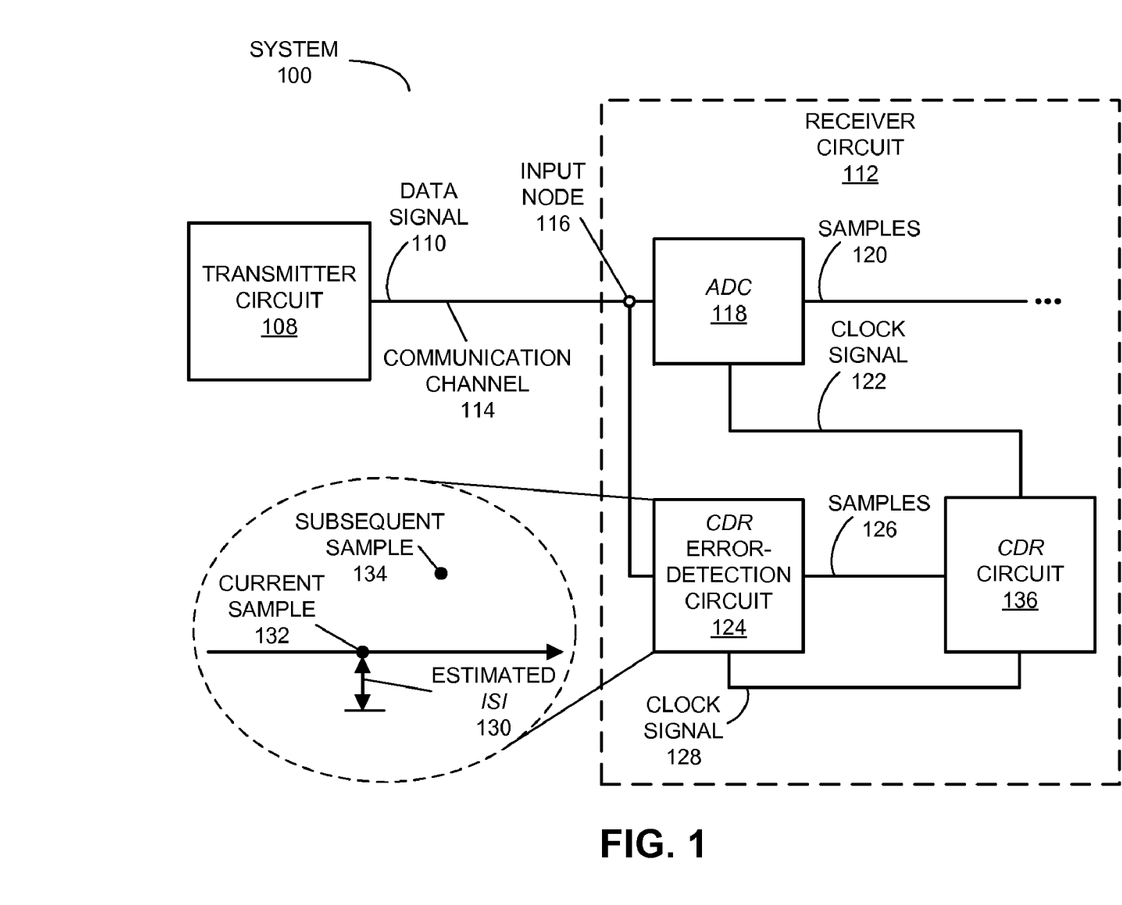
FIG. 1 is a block diagram illustrating a system that includes a receiver circuit in accordance with an embodiment of the present disclosure.
Figure 2:
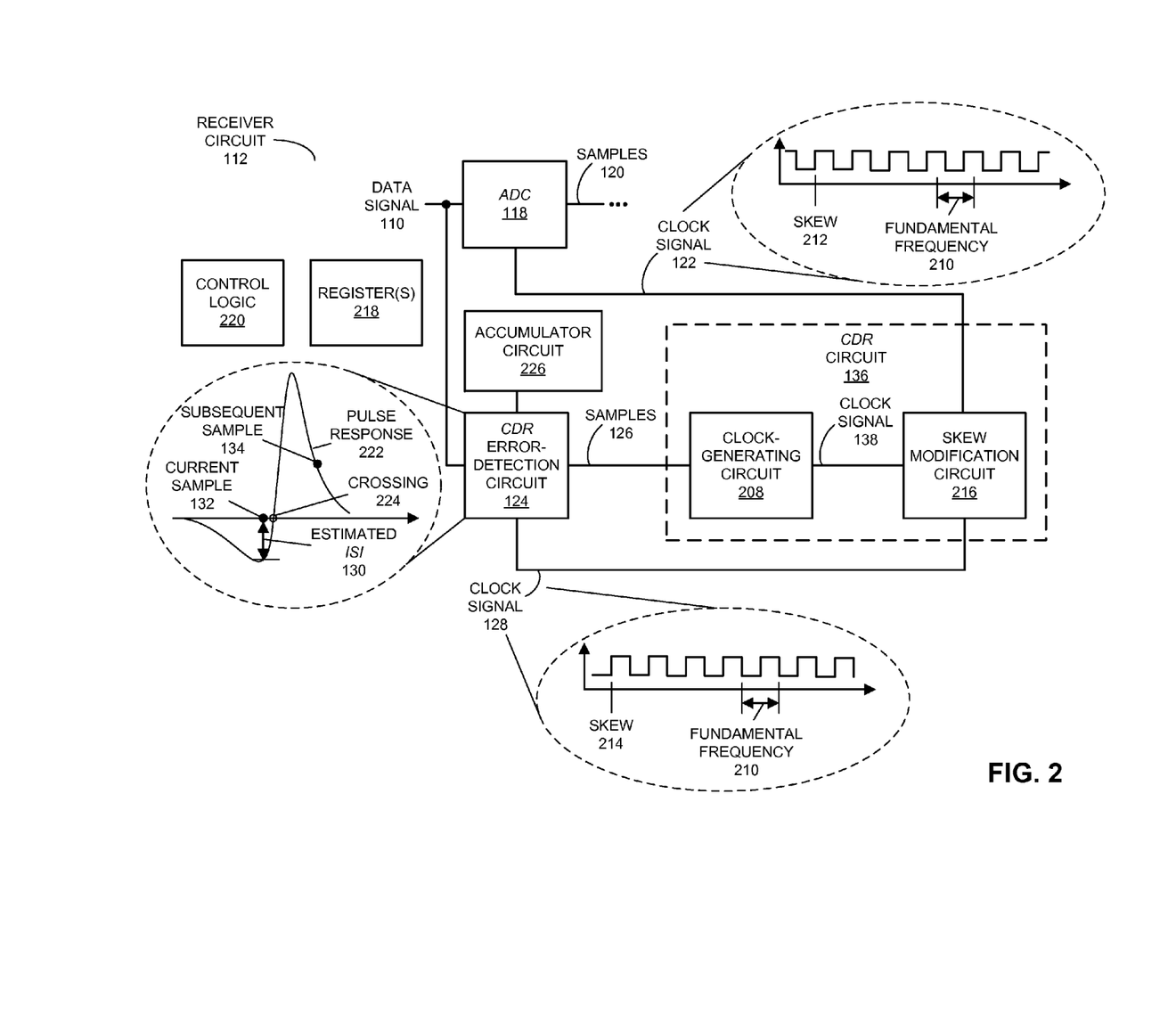
FIG. 2 is a block diagram illustrating the receiver circuit of FIG. 1 in accordance with an embodiment of the present disclosure.

We now describe embodiments of the receiver circuit and a system that includes the receiver circuit. FIG. 1 presents a block diagram illustrating a system 100 that includes a receiver circuit 112. This receiver circuit includes an input node 116 that receives a data signal 110 via a communication channel 114 from a transmitter circuit 108, and ADC 118 (and more generally a data slicer) that is electrically coupled to input node 116, and which generates samples 120 of data signal 110 based on a clock signal 122 (i.e., decisions about what information was communicated in data signal 110). Furthermore, receiver circuit 112 includes a CDR error-detection circuit 124 that is electrically coupled to input node 116, which generates samples 126 of data signal 110 based on a clock signal 128, and which estimates ISI 130 at a current sample 132 in samples 126 from an adjacent, subsequent sample 134 in samples 126. Additionally, receiver circuit 112 includes a CDR circuit 136 that is electrically coupled to the CDR error-detection circuit 124 in a feedback loop, which generates clock signal 122, clock signal 128 and a clock signal 138 (FIG. 2) based on samples 126 and estimated ISI 130, where clock signal 122 and clock signal 128 are generated from clock signal 138 (FIG. 2). Note that CDR circuit 136 attempts to track the clock phase or skew encoded in data signal 110 in order to maintain or increase the performance of system 100.

FIG. 2 presents a block diagram illustrating receiver circuit 112. In this receiver circuit, clock-generating circuit 208 generates clock signal 138. Moreover, CDR circuit 136 modifies a skew of clock signal 138 to generate clock signal 122, and modifies the skew of clock signal 138 to generate clock signal 128. Note clock signals 122 and 128 may have a common fundamental frequency 210. However, a skew 212 of clock signal 122 may be different than a skew 214 of clock signal 128, which (as described further below) may improve the performance of system 100 (FIG. 1). In this way, CDR circuit 136 may modify skews 212 and 214. For example, skew 214 may be based on a bit-error rate (or another performance metric); however, this skew may be sub-optimal for ADC 118 because of channel-dependent ISI. In general, skews 212 and 214 may result in sampling positions that are different than the middle of the bit-time interval corresponding to data signal 110, i.e., the sampling positions may be earlier or later than the middle of the bit-time interval. This may make system 100 (FIG. 1) more robust when used with different communication channels or when used with communication channels that have different characteristics.

In some embodiments, CDR circuit 136 includes a skew-modification circuit 216 to modify the skew of clock signal 138 to generate clock signal 122, and to modify the skew of clock signal 138 to generate clock signal 128. In particular, a skew of a given clock signal, which can include clock signal 122 or clock signal 128, may be selected from a set of pre-defined skews by CDR circuit 136. Alternatively, the skew of the given clock signal may be adjusted by skew-modification circuit 216.

In some embodiments, receiver circuit 112 includes one or more registers 218 to store information specifying skews 212 and 214 of clock signal 122 and clock signal 128, respectively. Note that register(s) 218 may be programmable (for example, they may be programmable from a location external to receiver circuit 112). However, a wide variety of techniques may be used to store information specifying skews 212 and 214, including: a non-volatile memory, a volatile memory, an array of resistors, a memory circuit and/or one or more fuses.

Alternatively or additionally, receiver circuit 112 may include control logic 220 to provide a signal to CDR circuit 136 that specifies the skew of the given clock signal. For example, control logic 220 may provide the signal based at least on a performance metric of receiver circuit 112, such as: a mean-square error between a predefined pulse response and given samples, which can include samples 120 or samples 126; and/or an error rate (such as a bit-error rate) associated with samples 120 and/or 126.

In some embodiments, ISI 130 is estimated using a pulse response 222 of communication channel 114 (FIG. 1). For example, clock signal 138 may be generated so that current sample 132 is associated with a zero crossing of pulse response 222 (such as crossing 224), thereby reducing or eliminating the ISI from adjacent, subsequent sample 134. Furthermore, CDR circuit 136 may include an accumulator circuit 226 that determines an accuracy of estimated ISI 130 during a time interval (such as over multiple bit-time intervals or clock periods).

Note that calibration of CDR circuit 136, and in particular, determining and/or specifying skews 212 and 214, may be performed: once, as needed (for example, when the performance metric degrades by more than 10, 20 or 50%), and/or continuously. For example, during the calibration, data signal 110 may correspond to a pseudorandom data sequence. Furthermore, during the calibration, CDR circuit 136 may try to align or lock the sampling positions to times where adjacent, subsequent sample 134 has little or no impact on current sample 132.

Figure 3:
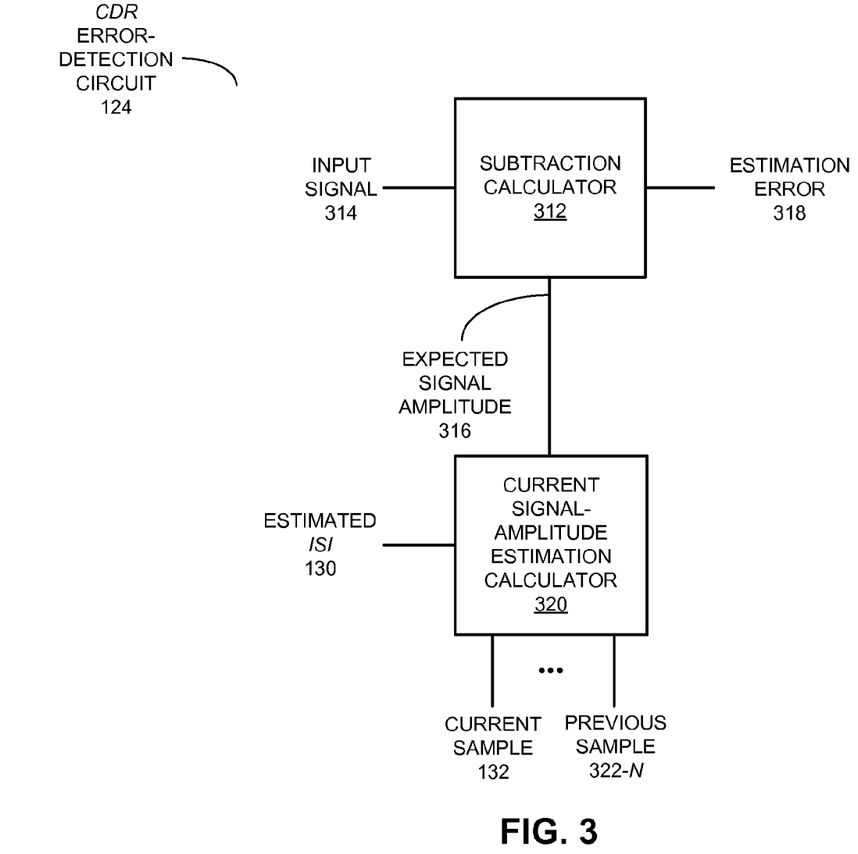
FIG. 3 is a block diagram illustrating a clock-data-recovery (CDR) error-detection circuit in the receiver circuit of FIG. 1 in accordance with an embodiment of the present disclosure.

FIG. 3 presents a block diagram illustrating a CDR error-detection circuit 124 in receiver circuit 112 (FIGS. 1 and 2). In this CDR error-detection circuit, a subtraction calculator 312 may compare an input signal 314 (such as analog data signal 110 or samples 120) and an expected signal amplitude 316 to determine an estimation error 318. This estimation error may be forwarded to CDR circuit 136 (FIGS. 1 and 2) for use in generating clock signal 138 (FIG. 2) and, thus, clock signals 122 and 128 (FIGS. 1 and 2).

Furthermore, current signal-amplitude estimation calculator 320 may determine expected signal amplitude 316 based on estimated ISI 130 and one or more of the single-bit slicer results in FIGS. 1 and 2, such as current sample 132, as well as one or more previous slicer results (such as previous sample 322-N). For example, N can be any number greater than one, such as 8, 16 or 32 samples 126 (FIGS. 1 and 2). Note that estimated ISI 130 may include taps in a filter (such as a finite-impulse-response filter or an infinite-impulse-response filter) that corresponds to pulse response 222 (FIG. 2) of communication channel 114 (FIG. 1).

Thus, CDR error-detection circuit 124 may use estimated ISI 130 to predict analog or digital values for expected signal amplitude 316, which are then compared to data signal 110 or samples 120. This difference is a measure of the accuracy of estimated ISI 130, which may be accumulated using accumulator circuit 226 (FIG. 2) to determine a running accuracy estimate. Moreover, the difference may be used by CDR circuit 136 (FIGS. 1 and 2) to determine the time where ISI from future data falls to zero.

Figure 4:
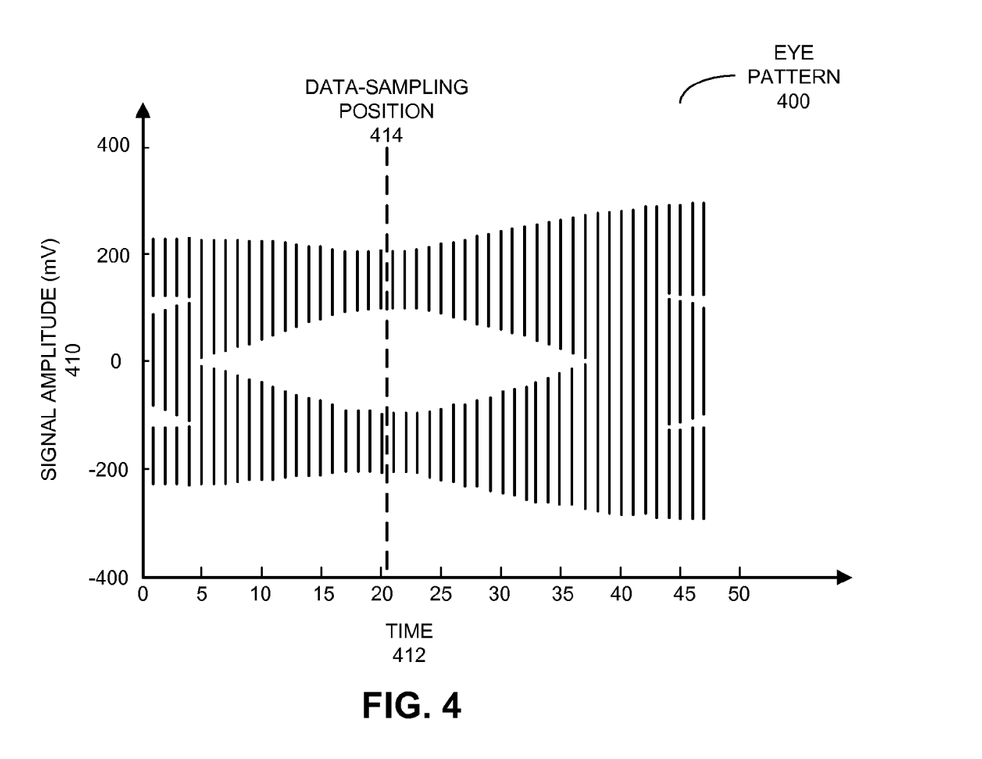
FIG. 4 is a drawing of an eye pattern in accordance with an embodiment of the present disclosure.

FIG. 4 presents a drawing of an eye pattern 400, showing signal amplitude 410 as a function of time 412 during a unit- or bit-time interval. This eye pattern may correspond to a data rate of 16 Gbps. Using CDR circuit 136 (FIGS. 1 and 2) and baud-rate sampling, skews 212 and 214 (FIG. 2) may be selected or adjusted so that data-sampling position 414 results in optimal or near optimal performance (such as a bit-error rate of 2.1E-43 and a voltage margin of 64.3 mV). Note that there may be 48 skew intervals in the bit-time interval. In addition, note that data-sampling position 414 is not in the middle of the bit-time interval.

In an exemplary embodiment, skew-modification circuit 216 (FIG. 2) is implemented using current mode logic. Furthermore, CDR circuit 136 (FIGS. 1 and 2) may use a least mean-square-error technique to select or adjust skews 212 and 214 (FIG. 2).

In some embodiments, during calibration, CDR circuit 136 (FIGS. 1 and 2) may initially try to lock skew 214 (FIG. 2). This is because estimated ISI 130 (FIGS. 1 and 2) and samples 126 (FIGS. 1 and 2) are based on clock signal 128 (FIGS. 1 and 2). For communication channels in which the resulting data-sampling position does not result in the optimum (or near optimum) performance, skews 212 and 214 (FIG. 2) may be selected or adjusted to improve the performance.

Receiver circuit 112 (FIGS. 1 and 2) may be used in a variety of applications, including: VLSI circuits, communication systems (such as a 10 Gbps serial link, Ethernet, PCI express, etc.), storage area networks, memory (for example, in a processor-to-memory link), data centers, networks (such as local area networks), and/or computer systems (such as multiple-core processor computer systems). For example, embodiments of the receiver circuit may be used in: a high-speed serial link in a processor (such as a 16 Gbps serial link, a coherence link, etc.), an embedded processor, a memory controller (including buffer-onboard application-specific integrated circuits), and/or a switch chip. Furthermore, the computer systems may include, but are not limited to: a server (such as a multi-socket, multi-rack server), a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Note that a given computer system may be at one location or may be distributed over multiple, geographically dispersed locations.

Receiver circuit 112 (FIGS. 1 and 2), as well as systems (such as system 100 in FIG. 1) that may include receiver circuit 112 (FIGS. 1 and 2), may include fewer components or additional components. For example, there may be a sense amplifier or a receive buffer after input node 116 and before ADC 118 in FIG. 1. Similarly, after ADC 118 in FIG. 1 there may be a serial-to-parallel converter. In addition, CDR error-detection circuit 124 (FIGS. 1 and 2) may consider ISI associated with additional samples than that associated with adjacent, subsequent sample 134 (FIGS. 1 and 2). Although receiver circuit 112 (FIGS. 1 and 2), as well as system 100 (FIG. 1), are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed.

Furthermore, note that circuits in these embodiments may be implemented using bipolar, PMOS and/or NMOS transistors, and signals in different portions of these circuits may include digital signals that have approximately discrete values and/or analog signals that have continuous values (i.e., the circuits may be implemented in the analog and/or digital domain). For example, subtraction calculator 312 (FIG. 3) and current signal-amplitude estimation calculator 320 (FIG. 3) may be implemented in the analog and/or digital domain. In addition, functionality in receiver circuit 112 (FIGS. 1 and 2) may be implemented more in hardware and less in software, or less in hardware and more in software, as is known in the art. In some embodiments, some or all of the functionality of receiver circuit 112 (FIGS. 1 and 2) is implemented in one or more application-specific integrated circuits (ASICs) and/or one or more digital signal processors (DSPs).

Figure 5:
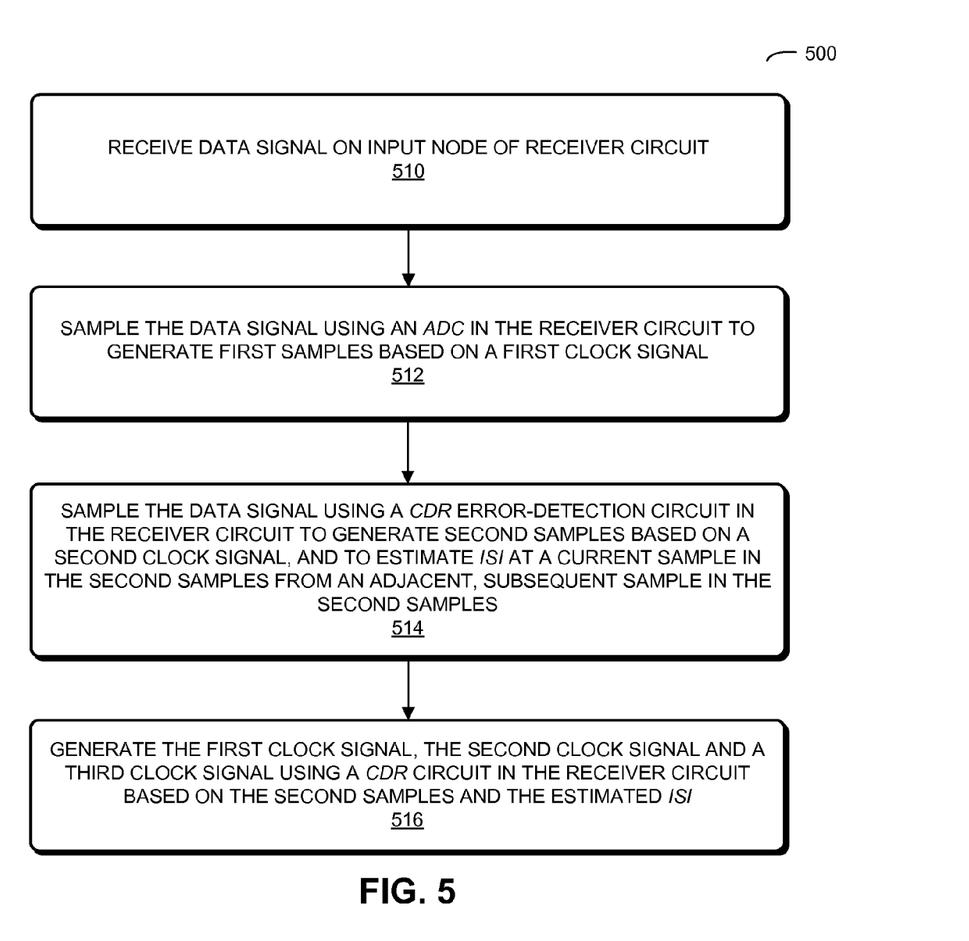
FIG. 5 is a flow chart illustrating a process for generating a first clock signal and a second clock signal using a receiver circuit in accordance with an embodiment of the present disclosure.

We now describe embodiments of a process. FIG. 5 presents a flow chart illustrating a process 500 for generating a first clock signal and a second clock signal using receiver circuit 112 (FIGS. 1-2). During operation, the input node of the receiver circuit receives the data signal (operation 510). Then, the ADC in the receiver circuit samples the data signal to generate the first samples based on the first clock signal (operation 512). Furthermore, the CDR error-detection circuit in the receiver circuit samples the data signal to generate the second samples based on the second clock signal and to estimate ISI at the current sample in the second samples from the adjacent, subsequent sample in the second samples (operation 514). Next, the CDR circuit in the receiver circuit generates the first clock signal, the second clock signal and the third clock signal based on the second samples and the estimated ISI (operation 516), wherein the first clock signal and the second clock signal are generated from the third clock signal.

In some embodiments of process 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A receiver circuit, comprising:
   a first input node configured to receive a data signal;
   an analog-to-digital converter (ADC), electrically coupled to the first input node, configured to generate first samples of the data signal based on a first clock signal;
   a clock-data-recovery (CDR) error-detection circuit, electrically coupled to the first input node, configured to generate second samples of the data signal based on a second clock signal, and configured to estimate intersymbol interference (ISI) at a current sample in the second samples from an adjacent, subsequent sample in the second samples; and
   a CDR circuit, electrically coupled to the CDR error-detection circuit, configured to generate the first clock signal, the second clock signal and a third clock signal based on the second samples and the estimated ISI, wherein the first clock signal and the second clock signal are generated from the third clock signal.

2. The receiver circuit of claim 1, wherein the CDR circuit modifies a skew of the third clock signal to generate the first clock signal;
   wherein the CDR circuit modifies the skew of the third clock signal to generate the second clock signal; and
   wherein the skew of the first clock signal is different than the skew of the second clock signal.

3. The receiver circuit of claim 2, wherein the CDR circuit includes a skew-modification circuit configured to modify the skew of the third clock signal to generate the first clock signal; and
   wherein the skew-modification circuit modifies the skew of the third clock signal to generate the second clock signal.

4. The receiver circuit of claim 2, wherein a skew of a given clock signal, which can include the first clock signal or the second clock signal, is selected from a set of predefined skews by the CDR circuit.

5. The receiver circuit of claim 2, wherein a skew of a given clock signal, which can include the first clock signal or the second clock signal, is adjusted by the CDR circuit.

6. The receiver circuit of claim 2, further comprising at least two registers configured to store information specifying the skews of the first clock signal and the second clock signal.

7. The receiver circuit of claim 6, wherein at least the two registers are programmable.

8. The receiver circuit of claim 2, further comprising control logic configured to provide a signal to the CDR circuit that specifies a skew of a given clock signal, which can include the first clock signal or the second clock signal.

9. The receiver circuit of claim 8, wherein the control logic provides the signal based at least on a performance metric of the receiver circuit.

10. The receiver circuit of claim 9, wherein the performance metric includes a mean-square error between a predefined pulse response and given samples, which can include the first samples or the second samples.

11. The receiver circuit of claim 9, wherein the performance metric includes an error rate associated with the first samples.

12. The receiver circuit of claim 1, wherein the first clock signal and the second clock signal have a common fundamental frequency and different skews.

13. The receiver circuit of claim 1, wherein the receiver circuit is configured to couple to a communication channel that communicates the data signal to the receiver circuit; and
   wherein the ISI is estimated using a pulse response of the communication channel.

14. The receiver circuit of claim 13, wherein the third clock signal is generated so that the current sample is associated with a zero crossing of the pulse response, thereby reducing or eliminating the ISI from the adjacent, subsequent sample.

15. The receiver circuit of claim 1, wherein the CDR circuit includes an accumulator circuit configured to determine an accuracy of the estimated ISI during a time interval.

16. A system, comprising:
   a transmitter circuit configured to provide a data signal;
   a communication channel electrically coupled to the transmitter circuit; and
   a receiver circuit electrically coupled to the communication channel, wherein the receiver circuit includes:
      a first input node configured to receive the data signal;
      an ADC, electrically coupled to the first input node, configured to generate first samples of the data signal based on a first clock signal;
      a CDR error-detection circuit, electrically coupled to the first input node, configured to generate second samples of the data signal based on a second clock signal, and to estimate intersymbol interference (ISI) at a current sample in the second samples from an adjacent, subsequent sample in the second samples; and
      a CDR circuit, electrically coupled to the CDR error-detection circuit, configured to generate the first clock signal, the second clock signal and a third clock signal based on the second samples and the estimated ISI, wherein the first clock signal and the second clock signal are generated from the third clock signal.

17. The system of claim 16, wherein the CDR circuit modifies a skew of the third clock signal to generate the first clock signal;

wherein the CDR circuit modifies the skew of the third clock signal to generate the second clock signal; and wherein the skew of the first clock signal is different than a skew of the second clock signal.

18. The system of claim 16, wherein the CDR circuit includes a skew-modification circuit configured to modify a skew of the third clock signal to generate the first clock signal;

wherein the skew-modification circuit modifies a skew of the third clock signal to generate the second clock signal; and wherein the skew of the first clock signal is different than a skew of the second clock signal.

19. The system of claim 16, further comprising at least two registers configured to store information specifying the skews of the first clock signal and the second clock signal.

20. A method for generating a first clock signal and a second clock signal using a receiver circuit, comprising:

receiving a data signal at an input node of the receiver circuit;

sampling the data signal to generate first samples using an ADC in the receiver circuit based on the first clock signal;

sampling the data signal to generate second samples based on the second clock signal and to estimate ISI at a current sample in the second samples from an adjacent, subsequent sample in the second samples using a CDR error-detection circuit in the receiver circuit; and generating the first clock signal, the second clock signal and a third clock signal using a CDR circuit in the receiver circuit based on the second samples and the estimated ISI, wherein the first clock signal and the second clock signal are generated from the third clock signal.

* * * * *